(12) United States Patent
Riga et al.

(10) Patent No.: US 9,690,482 B2
(45) Date of Patent: Jun. 27, 2017

(54) DATA STORAGE ORGANISATION TECHNIQUE

(71) Applicant: ARM LIMITED, Cambridge (GB)

(72) Inventors: Michele Riga, Cambridge (GB); Maz Zardini, Cambridge (GB)

(73) Assignee: ARM Limited, Cambridge (GB)

(*) Notice: Subject to any disclaimer, the term of this patent is extended or adjusted under 35 U.S.C. 154(b) by 309 days.

(21) Appl. No.: 14/531,596

(22) Filed: Nov. 3, 2014

(65) Prior Publication Data

US 2016/0124644 A1  May 5, 2016

(51) Int. Cl.
*G06F 12/00* (2006.01)
*G06F 3/06* (2006.01)

(52) U.S. Cl.
CPC ............ *G06F 3/0604* (2013.01); *G06F 3/064* (2013.01); *G06F 3/0673* (2013.01)

(58) Field of Classification Search
None
See application file for complete search history.

(56) References Cited

U.S. PATENT DOCUMENTS 6,320,812 B1 * 11/2001 Cook, III ............... G11C 29/56
                                                           711/105
2015/0089164 A1 * 3/2015 Ware ....................... G11C 5/02
                                                           711/149

OTHER PUBLICATIONS

Koopman (cache organization, 18-548/15-548 Memory System Architecture, Carnegie Mellon, Sep. 2, 1998).*

* cited by examiner

*Primary Examiner* — Ryan Bertram
*Assistant Examiner* — Jason Blust
(74) *Attorney, Agent, or Firm* — Nixon & Vanderhye P.C.

(57) ABSTRACT

A data storage apparatus and method of storing data in a data storage apparatus are provided, where the data storage apparatus comprises multiple banks for storing data. The multiple banks form multiple bank groups, wherein each bank group comprising more than one bank. A first data item of a received data block is stored at a selected storage location in a selected bank and a subsequent data item of the data block is stored to a further storage location in a different bank according to a sequence of banks. The sequence of banks firstly comprises the selected bank followed by all other banks in the bank group of the selected bank. Moreover the sequence of banks respects a hierarchical pattern, wherein a finer granularity of the hierarchical pattern comprises all banks in a given bank group, and a coarser granularity of the hierarchical pattern comprises the given bank group followed by a different bank group to the given bank group. Access to the data storage apparatus is thereby improved.

17 Claims, 12 Drawing Sheets

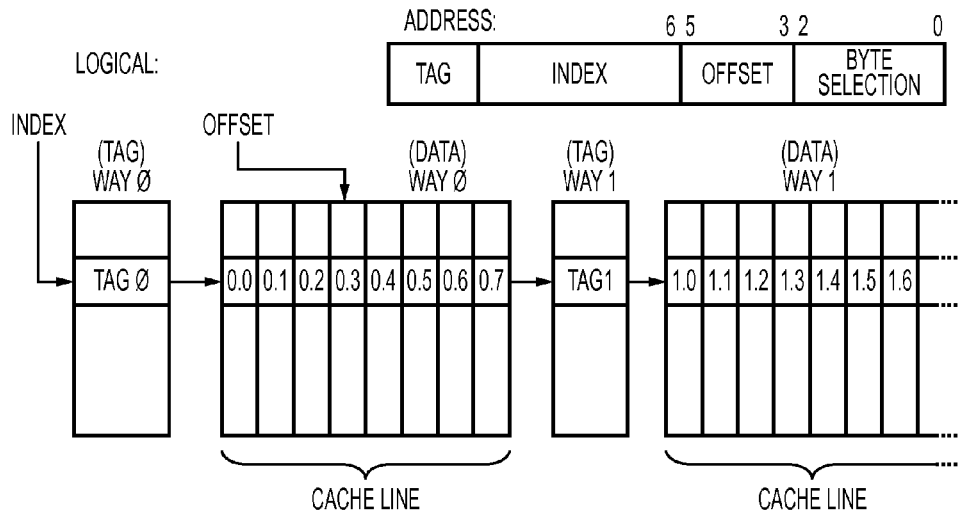
FIG. 2A
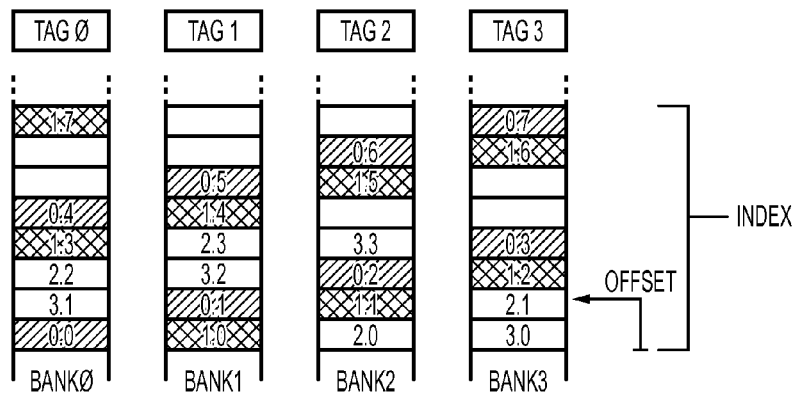
FIG. 2B
| A: | CHUNK 0 | (0.0, 0.1) | A + B | ✓ | | |
| B: | CHUNK 1 | (0.2, 0.3) | A + C | ✗ | B + C | ✗ |
| C: | CHUNK 0 | (1.0, 1.1) | A + D | ✗ | B + D | ✗ |
| D: | CHUNK 1 | (1.2, 1.3) | C + D | ✓ | | |
FIG. 2C

| 7 | 8 | 6 | 10 | 11 | 9 | 1 | 2 | 0 | 4 | 5 | 3 |
|---|---|---|---|---|---|---|---|---|---|---|---|
| 8 | 6 | 7 | 11 | 9 | 10 | 2 | 0 | 1 | 5 | 3 | 4 |
| 6 | 7 | 8 | 9 | 10 | 11 | 0 | 1 | 2 | 3 | 4 | 5 |
| 10 | 11 | 9 | 1 | 2 | 0 | 4 | 5 | 3 | 7 | 8 | 6 |
| 11 | 9 | 10 | 2 | 0 | 1 | 5 | 3 | 4 | 8 | 6 | 7 |
| 9 | 10 | 11 | 0 | 1 | 2 | 3 | 4 | 5 | 6 | 7 | 8 |
| 1 | 2 | 0 | 4 | 5 | 3 | 7 | 8 | 6 | 10 | 11 | 9 |
| 2 | 0 | 1 | 5 | 3 | 4 | 8 | 6 | 7 | 11 | 9 | 10 |
| 0 | 1 | 2 | 3 | 4 | 5 | 6 | 7 | 8 | 9 | 10 | 11 |

| BANK GROUP 0 | BANK GROUP 1 | BANK GROUP 2 | BANK GROUP 3 |

FIG. 7

BANK TO WAY TRANSLATION:

ADDRESS [4:3]  = 2'b Ø Ø :WAY  =  {BANK NUMBER[1],  BANK NUMBER[0]}

= 2'b Ø 1 :WAY  =  {BANK NUMBER[1], ~BANK NUMBER[0]}

= 2'b 1 Ø :WAY  =  {~BANK NUMBER[1],  BANK NUMBER[0]}

= 2'b 1 1 :WAY  =  {~BANK NUMBER[1], ~BANK NUMBER[0]}

DATA STORAGE ORGANISATION TECHNIQUE

TECHNICAL FIELD

The present disclosure relates to data processing. More particularly, the disclosure relates to the organisation of data stored in a data storage apparatus.

DESCRIPTION OF THE PRIOR ART

It is known to provide a data storage apparatus capable of storing (i.e. having a configuration which enables it to store) multiple data items which a data processing apparatus can access and use in its data processing operations. Such a data storage apparatus may take a wide variety of forms, such as an external DRAM memory, a cache memory storing temporary copies of data items retrieved from an external memory, a tightly coupled memory (TCM) closely linked to the data processing apparatus and so on. The organisation of the data items stored in such a data storage apparatus can have consequences for the ease of access of those data items, both in terms of originally writing the data items to the data storage apparatus and then when later retrieving those data items from the data storage apparatus. The present techniques relate to improvements in the organisation of data items stored in a data storage apparatus.

SUMMARY

Viewed from a first aspect, the present techniques provide a data storage apparatus comprising: multiple banks for storing data, wherein each bank of the multiple banks comprises multiple storage locations, each storage location for storing a data item, wherein the multiple banks form multiple bank groups, each bank group comprising more than one bank; an input for receiving a data block for storage, wherein the data block comprises multiple data items; and storage circuitry for storing a first data item of the data block at a selected storage location in a selected bank and for storing a subsequent data item of the data block to a further storage location in a different bank according to a sequence of banks, wherein the sequence of banks firstly comprises the selected bank followed by all other banks in the bank group of the selected bank, and wherein the sequence of banks respects a hierarchical pattern, wherein a finer granularity of the hierarchical pattern comprises all banks in a given bank group, and a coarser granularity of the hierarchical pattern comprises the given bank group followed by a different bank group to the given bank group.

Viewed from a second aspect the present techniques provide a method of storing data in a data storage apparatus comprising multiple banks, wherein each bank of the multiple banks comprises multiple storage locations, each storage location for storing a data item, and wherein the multiple banks form multiple bank groups, each bank group comprising more than one bank, the method comprising the steps of: receiving a data block for storage, wherein the data block comprises multiple data items; and storing a first data item of the data block at a selected storage location in a selected bank and for storing a subsequent data item of the data block to a further storage location in a different bank according to a sequence of banks, wherein the sequence of banks firstly comprises the selected bank followed by all other banks in the bank group of the selected bank, and wherein the sequence of banks respects a hierarchical pattern, wherein a finer granularity of the hierarchical pattern comprises all banks in a given bank group, and a coarser granularity of the hierarchical pattern comprises the given bank group followed by a different bank group to the given bank group.

Viewed from a third aspect the present techniques provide a data storage apparatus comprising: means for storing data in multiple banks, wherein each bank of the multiple banks comprises multiple storage locations, each storage location for storing a data item, wherein the multiple banks form multiple bank groups, each bank group comprising more than one bank; means for receiving a data block for storage, wherein the data block comprises multiple data items; and means for storing a first data item of the data block at a selected storage location in a selected bank and for storing a subsequent data item of the data block to a further storage location in a different bank according to a sequence of banks, wherein the sequence of banks firstly comprises the selected bank followed by all other banks in the bank group of the selected bank, and wherein the sequence of banks respects a hierarchical pattern, wherein a finer granularity of the hierarchical pattern comprises all banks in a given bank group, and a coarser granularity of the hierarchical pattern comprises the given bank group followed by a different bank group to the given bank group.

BRIEF DESCRIPTION OF THE DRAWINGS

The present invention will be described further, by way of example only, with reference to embodiments thereof as illustrated in the accompanying drawings, in which:

FIGS. 2A and 2B schematically illustrate a configuration of a set associative cache in terms of its logical and physical organisation of stored data items;

FIG. 2C shows example access patterns for example data chunks stored in the cache of FIGS. 2A and 2B;

FIG. 7 schematically illustrates the physical arrangement of stored data items in a data storage apparatus in one embodiment;

FIG. 10A shows the logical translation between bank and way numbers in one embodiment;

DESCRIPTION OF EXAMPLE EMBODIMENTS

Figure 1:
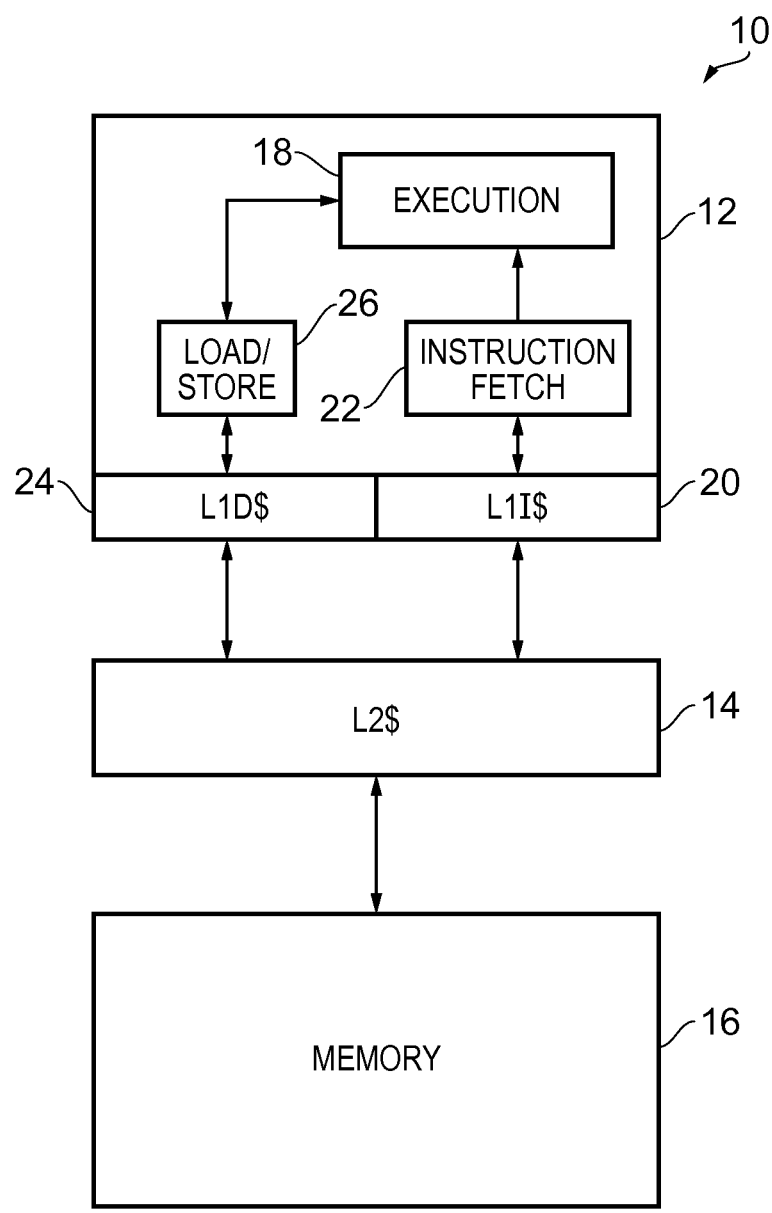
FIG. 1 schematically illustrates a data processing system comprising several data storage apparatuses arranged in a memory hierarchy and comprising at least one data storage device according to an embodiment.

The present techniques recognise that where a data storage apparatus comprises multiple banks for storing data it is advantageous to arrange these multiple banks into multiple bank groups, and then when arranging data items to be stored in the data storage apparatus (e.g. when allocating a cache line into a cache which has such an arrangement of multiple banks and multiple bank groups) that it is further advantageous not only to take into account the usage of different banks as sequential data items of a data block are stored into the data storage apparatus, but also the bank groups. In particular, the present techniques propose a sequence of banks to which sequential data items are stored (in a storage location in each bank) which respects a hierarchical pattern. At a first level (finer granularity), i.e. for at least two data items in sequence, the hierarchical pattern comprises all the banks in a given bank group, whilst at a higher level (coarser granularity) of the hierarchical pattern, i.e. now considering how blocks of those at least two sequential data items are treated, the hierarchical pattern comprises different bank groups. In other words, when storing data items to the banks of the data storage apparatus all banks in a given bank group are "used up" before moving onto another bank group. This enables the circuitry associated with the banks which directs the data items to be stored to the selected bank to be provided for each bank group in a manner which is independent of the same circuitry provided for another bank group. In consequence, this independence of the storage of data items into the bank groups means that one or more data item can be written to or read from each bank group simultaneously, without conflicting needs between those bank groups arising. For example, where sequential data items, which are provided in sequence and should be retrieved in sequence, cross a boundary between bank groups, this would otherwise require coordination between the access circuitry for the relevant bank groups. However, the present techniques arrange the data items stored in the data storage apparatus in a manner in which sequential data items are "concentrated" in bank groups, enabling a greater degree of independence between the access circuitry of those bank groups. By doing so increases the permutations of concurrent storage operations (whether read or write) which can be made to the data storage apparatus, and moreover simplifies the respective access circuitry because of the greater degree of independence between bank groups.

In some embodiments, the coarser granularity of the hierarchical pattern comprises the given bank group followed by all other bank groups. This arrangement increases the use of the banks and bank groups in the hierarchical pattern, thus further supporting a distributed usage of the banks of the data storage apparatus, before the hierarchical pattern necessarily requires a selected bank to be used again in the sequence of banks. This can, for example, be of advantage when the data storage apparatus is a cache, and a cache line corresponding in size to the width of the multiple banks of the cache is to be allocated to the cache, since the whole cache line can then be allocated in one cycle.

In some embodiments, each storage location in each bank is identified by an index and an offset from the index and the storage circuitry is capable of incrementing an offset of the selected storage location to give an offset of the further selected storage location. Thus, sequential storage locations used by the storage apparatus to store data items not only progress in the above described manner through the banks and bank groups, but also progress in an incremental manner through the indices of the storage locations. This increment may be the smallest increment possible in the index, but in other contemplated embodiments could be multiples of that smallest increment. This arrangement thus provides an efficient mechanism for ensuring that a regular, and thus relatively easily administered, pattern of storage locations is used for the sequence of data items, and furthermore provides that when a bank is returned to for the next iteration of the hierarchical pattern an appropriately spaced storage location for the next storage location of the next iteration of the hierarchical pattern is selected.

The manner in which the storage circuitry selects banks within a bank group in order to respect the finer level of granularity of the hierarchical pattern (i.e. using all banks in a given bank group) may take a variety of forms, but in some embodiments the storage circuitry is capable of incrementing bank numbers, with wrap-around when required to cover all banks per bank group, at the finer granularity of the hierarchical pattern. The manner in which the storage circuitry selects bank group numbers in order to respect the coarser level of granularity of the hierarchical pattern may also take a variety of forms, but in some embodiments the storage circuitry is capable of incrementing bank group numbers, with wrap-around when required to cover all bank groups, at the coarser granularity of the hierarchical pattern.

Accordingly, the storage circuitry can be capable (at the bank level and/or the bank group level) to implement an incremental usage of bank numbers and/or bank group numbers, wherein wrap-around is used when required to cover all banks per bank group and/or bank groups in the data storage apparatus. In other words, for example, if the first bank used in a bank group has a lowest available bank number, incrementing the bank numbers will cover all banks in that bank group without wrap-around, but if the first bank used in a bank group is not the lowest bank number available, the sequence within the bank group wraps around to the lowest bank number (and possibly then further by increment) to cover all banks in the bank group. A similar technique may also be applied to the incrementation of bank group numbers.

The data block received by the data storage apparatus at its input for storage may be variously sized, but in some embodiments a size of each storage location times a number of banks in each bank group equals the size of the data block. In other words, the storage width of each bank group is sized to match the width of the data block which the storage apparatus is capable of receiving at its input. This alignment of the size of the bank groups with the input data provides that a full bank group can be written in one cycle, lending efficiency to the configuration of the storage process.

In some embodiments, the storage circuitry further comprises allocation circuitry for allocating data items for storage, wherein the allocation circuitry comprises an independent allocation queue for each bank group. The above described independence of the bank groups (in terms of the storage of data items) can be taken advantage of in this manner, in which each bank group can have its own queue for data allocation, thus supporting a greater number of permutations of data storage to the individual bank groups.

In some embodiments the allocation circuitry comprises more than one data buffer for each bank group, wherein each data buffer is capable of buffering the data block. This arrangement thus further supports the ability to store data into each bank group not only independently but also in a variety of permutations within each bank group, in dependence on how data blocks are buffered in the more than one data buffer for each bank group. Moreover, the provision of these buffers decouples the reception of a data block by the data storage apparatus at its input from the allocation of that data block for storage in the data storage apparatus.

In some embodiments the data storage apparatus further comprises data reordering circuitry coupled to the input, the data reordering circuitry for reordering data items within the data block received to correspond to an order given by the sequence of banks. Thus in a configuration in which the allocation circuitry comprises independent allocation for each bank group, a more compact data storage apparatus is provided by arranging data reordering circuitry between the input and the allocation circuitry, since this avoids the need for such reordering circuitry to be provided in each allocation queue for each bank group.

The data reordering circuitry may have a variety of configurations, but in some embodiments the data reordering circuitry is capable of switching a first half of the data block and a second half of the data block.

In some embodiments, each bank has a single read/write port. The application of the present techniques are of benefit in the context of a data storage apparatus having only one read/write port for each bank, since a single port can only be used for one purpose at a time, i.e. a single write to the bank or a single read, yet the provision of only a single read/write port is also generally advantageous because multiple ports per bank are expensive in terms of their required layout and energy consumption. Hence the present techniques allow the continued use of such a single port configuration but with the further ability as described above for greater flexibility in how the data items may be stored to the banks of the data storage apparatus.

In some embodiments the data storage apparatus further comprises arbitration circuitry for selecting between multiple accesses, wherein the arbitration circuitry comprises an arbitrator for each bank group and each arbitrator is capable of arbitration independently of the other arbitrators. The data storage apparatus may be required to respond to access requests from a variety of sources. These sources could for example comprise a data processing apparatus closely associated with the data storage apparatus (as in the example of a central processing unit (CPU) accessing a level one instruction cache), another data processing apparatus (e.g. where another CPU is also permitted read access to the data storage apparatus to view its content), and requests for allocation to the data storage apparatus. Where the arbitration circuitry comprises an arbitrator for each bank group and each arbitrator is capable of arbitration independently of the other arbitrators, this further supports the independent use of the bank groups, and therefore their parallel operation when responding to those multiple access sources, and thus a more overall efficient usage of the data storage apparatus.

In some embodiments, each arbitrator comprises a bank group filter, each bank group filter for suppressing a read access to that bank group for a memory address used in a previous read access. For example, in the situation where a data storage apparatus has at a previous iteration performed a read access (where at that stage it was not known which bank group was currently storing the required set of data items to be read), at a second iteration of that same read access (e.g. where a CPU issues a read access to the same cache line twice or more in succession) the bank group filter in each arbitrator of all but one bank group can suppress the read access, thus making those bank groups available for another access, if it was established as a result of the previous read access that these bank groups did not contain the required data items.

In some embodiments the bank group filters are coupled together communicatively such that only one bank group filter does not suppress the read access. This further supports the configuration in which a subsequent same read access request is only applied to one bank group, when it is known that the required data items are stored in that bank group.

The data storage apparatus may take a variety of forms, but in some embodiments the data storage apparatus is a set associative cache. A set associative cache, for example such as a level one instruction cache closely associated with a CPU, may benefit from the present techniques because of the reduced number of cycles in which certain permutations of data retrieval can be achieved, thus promoting efficient and faster data processing in the data processing apparatus accessing the data storage apparatus.

The set associative cache may take a variety of forms, but in some embodiments a number of the multiple banks for storing data corresponds to a number of ways in set associative cache. Matching the number of ways to the number of banks in the set associative cache can facilitate the addressing of data items stored in the set associative cache, since this for example allows the first data item in a cache line to always be stored at a location indicated in one of the banks by an index taken from the corresponding memory address, with no offset.

In some embodiments the multiple banks for storing data are capable of storing tag data of the set associative cache, wherein storage of the tag data in storage locations of the multiple banks is not subject to the sequence of banks. The access (e.g. look up) requirements relating to the tag data mean that a direct manner of storage is advantageous for the tag data and hence the storage of the tag data in the storage locations of the multiple banks may not be subject to the sequence of banks in the manner that the associated data items are subject to the sequence of banks.

FIG. 1 schematically illustrates a data processing system 10 comprising a data processing apparatus 12, a level 2 cache (L2$) 14 and an external memory 16. The data processing apparatus 12 executes data processing instructions in its execution unit 18 in order to carry out data processing operations, the data processing instructions having been retrieved from the memory hierarchy represented by the external memory 16, the L2 cache 14 and a level 1 instruction cache (L1I$) 20 provided in close association with the data processing apparatus 12. Retrieval of instructions from this part of the memory hierarchy is handled on behalf of the execution unit 18 of the data processing apparatus 12 by an instruction fetch unit 22. Similarly, a level 1 data cache (L1D$) 24 is also provided in close association with the data processing apparatus 12 and a load/store unit 26 interacts with the memory hierarchy to retrieve data items and store them (possibly modified by data processing operations) back to the memory hierarchy. The present techniques may be applied to any of the data storage apparatuses 14, 16, 20, 24 shown in the example of FIG. 1, but in the following further description is made with reference to the example where the present techniques are applied to the level 1 instruction cache 20.

FIGS. 2A and 2B illustrate how data items may be stored both logically and physically in a set associative cache. FIG. 2A firstly illustrates a memory address and the usage of different portions of that memory address in administering the storage of a corresponding set of data items retrieved from the memory location indicated by this address. Being a set associative cache, the corresponding set of data items is stored in one of four possible locations in the cache, namely in one of four ways. Only two of these ways are shown in the logical representation in FIG. 2A, merely for clarity of illustration. As can be seen in this logical representation an index portion of the memory address is used to identify a particular entry in both the tag portion and the data portion of each way. By means of a lookup procedure, with which the skilled person will be familiar, if the required memory address has a corresponding entry stored in this set associative cache then the tag portion of the address will match with the content of a tag portion stored of one of the tag ways. This then enables the corresponding cache line to be identified in the data portion of that way and retrieved.

The physical representation shown in FIG. 2B illustrates how cache lines such as those shown in the logical representation of FIG. 2A may be stored in a set associative cache having four banks. As can be recognised from the numbering of the individual data items shown in FIG. 2B, for a given cache line in a given way of the cache, a first data item of the cache line (0.0, 1.0, etc) is physically stored in a storage location indicated by just the index portion of the memory address (i.e. with no offset). Furthermore, the first data item of a cache line in way 0 is stored in bank 0, a first data item of a cache line stored in way 1 is stored in bank 1, and so on. It can be then also be seen from the physical layout shown in FIG. 2B and the numbering of the data items that their storage in the banks of the cache follow a corkscrew pattern, such that each subsequent data item is stored at a storage location incremented by one bank and incremented by one offset position. The usage of the banks wraps around from bank 3 to bank 0, such that the example cache line in way 0 (comprising data item 0.0 to data item 0.7) follows a diagonal line crossing the set of four banks twice (see diagonally hatched boxes in the figure). By comparison the cache line for way 1 (data items 1.0 to 1.7) also follows a diagonal line (see horizontally hatched boxes in the figure), but this wraps around twice, beginning in bank 1 and finally ending in bank 0.

Whilst this corkscrew arrangement of the storage of data items in a cache may be viewed as beneficial, the present techniques recognise that in fact circumstances may arise in which it has disadvantages. This is illustrated by the cache accesses A-D shown in FIG. 2C. Each of these cache accesses corresponds to a "chunk" of data comprising two data items, where in this example, where a data item has a width of 64 bits, each is thus a 128-bit data chunk. Cache accesses A and B can be seen to correspond to the first half of the cache line in way 0. Similarly, cache accesses C and D can be seen to correspond to the first half of the cache line stored in way 1. Each of the physical banks shown in FIG. 2B for this cache has a single read/write port, such that at a given cycle only one data item from that bank may be written to or read from. The corkscrew pattern described above, according to which the data items are physically stored in the four banks of this cache, is such that cache accesses A and B can be carried out simultaneously (i.e. in a single cycle) because each of the required data items is stored in a different bank. Similarly cache accesses C and D can be carried out together (i.e. in a single cycle) because each of the corresponding data items is stored in a different bank. These possibilities are indicated on the right of FIG. 2C. However, the present techniques recognise that other combinations of these cache accesses i.e. A+C, B+C, A+D and B+D may not be carried out simultaneously (i.e. in a single cycle) because each of these pairs of cache accesses comprises more than one data item stored in a given bank, thus requiring more than one cycle to perform both cache accesses.

Figure 3:
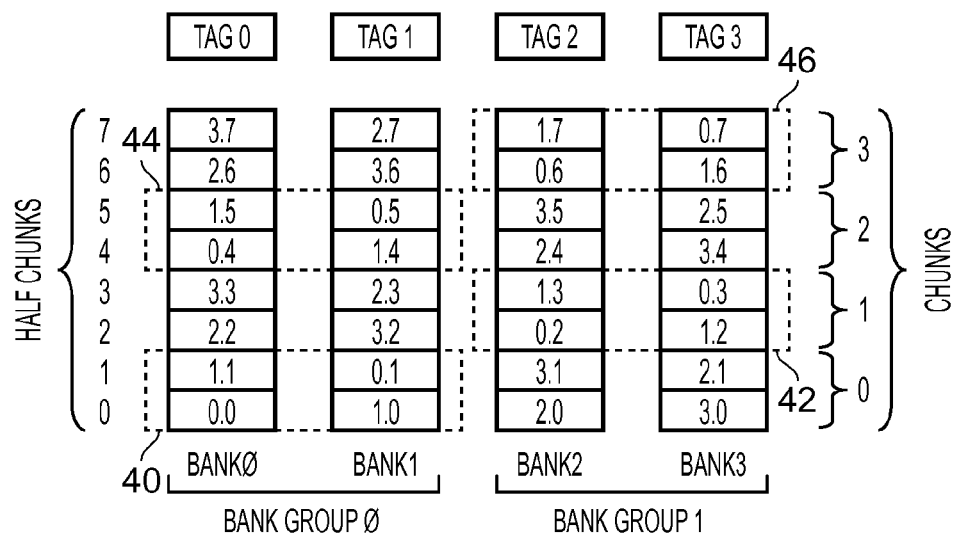
FIG. 3 schematically illustrates the physical organisation of data items stored in a set associative cache in one embodiment and some example access patterns for the same example data chunks as shown in FIG. 2C.

FIG. 3 illustrates the physical storage locations of the data items of the logical cache lines shown in FIG. 2A, but according to one embodiment of the present techniques. Note first of all that the overall physical structure of the cache shown in FIG. 3 is similar to that shown in FIG. 2B, namely that it comprises four banks. However, as indicated in FIG. 3, these banks are organised into groups, wherein bank 0 and bank 1 form bank group 0, and bank 2 and bank 3 form bank group 1. The storage of the data items of the cache lines shown in FIG. 2A, and indeed continuing to show examples for all four ways of this cache (i.e. cache lines comprising data items 0.0-0.7, 1.0-1.7, 2.0-2.7 and 3.0-3.7) is shown. The particular arrangement of the data items making up these cache lines shown in FIG. 3 illustrates one example embodiment. In particular, it should be noted that the sequence of banks used for storing sequential data items of a given cache line follows a hierarchical pattern. The dashed boxes 40, 42, 44 and 46 help to illustrate this hierarchical pattern. For example, note that the data items forming the cache line stored in way 0 (i.e. data items 0.0-0.7) in fact follow the same pattern as that shown in FIG. 2B, although these are nevertheless in accordance with the hierarchical pattern proposed by the present techniques, namely that at a finer level of granularity (within one of the dashed boxes 40-46) of the hierarchical pattern the sequence firstly makes use of all banks in the bank group, and at a coarser level of granularity (i.e. considering the dashed boxes 40-46 as individual units and observing the pattern of those units), the hierarchical pattern followed by the cache line from way 0 firstly progresses diagonally upwards and rightwards through dashed box 40, and then diagonally upwards and rightwards through dashed box 42, then returns to bank 0 in bank group 0 and proceeds diagonally upwards and rightwards through dashed box 44, and finally proceeds upwards and rightwards through dashed box 46.

Now consider, the physical arrangement of the data items stored for the cache line in way 1 of the cache (i.e. data items 1.0-1.7). The first of these (1.0) is stored in the first storage location indicated by the index of the memory address corresponding to this cache line, and being the cache line taken from way 1 its first data item is stored in bank 1. The next data item of this cache line (1.1) however, is stored in bank 0, because banks 0 and 1 form a bank group and the finer level of granularity of the hierarchical pattern requires all banks in any given bank group to be used before moving on to a different bank group. Accordingly, the data items are stored for this cache line rising upwards and leftwards in dashed box 40, then again rising upwards and leftwards in dashed box 42, then rising upwards and leftwards in dashed box 44, and finally rising upwards and leftwards in dashed box 46. Note that a given data block (referred to as a chunk in this example) is always entirely contained within a defined bank group.

One benefit of this physical arrangement of the data items in the banks of this cache can be seen from a consideration of the same cache accesses A-D as were discussed with reference to FIG. 2C. In particular, note that whilst cache accesses A+B can still be performed simultaneously and cache accesses C+D can still be performed simultaneously it is now also possible to perform either cache accesses A+D together or cache accesses B+C together since for each of these combinations the data items are each stored in different banks.

Figure 4:
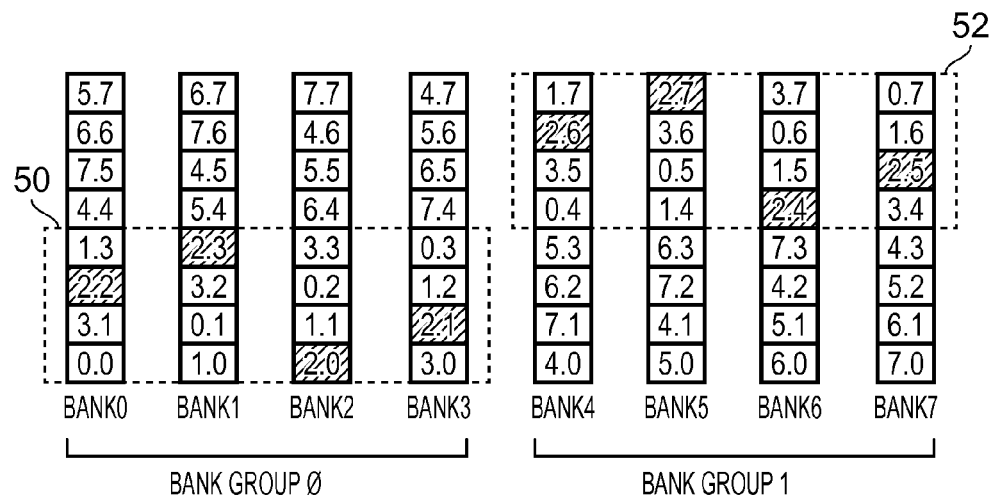
FIG. 4 schematically illustrates the physical arrangement of stored data items in a data storage apparatus in one embodiment.
Figure 5:
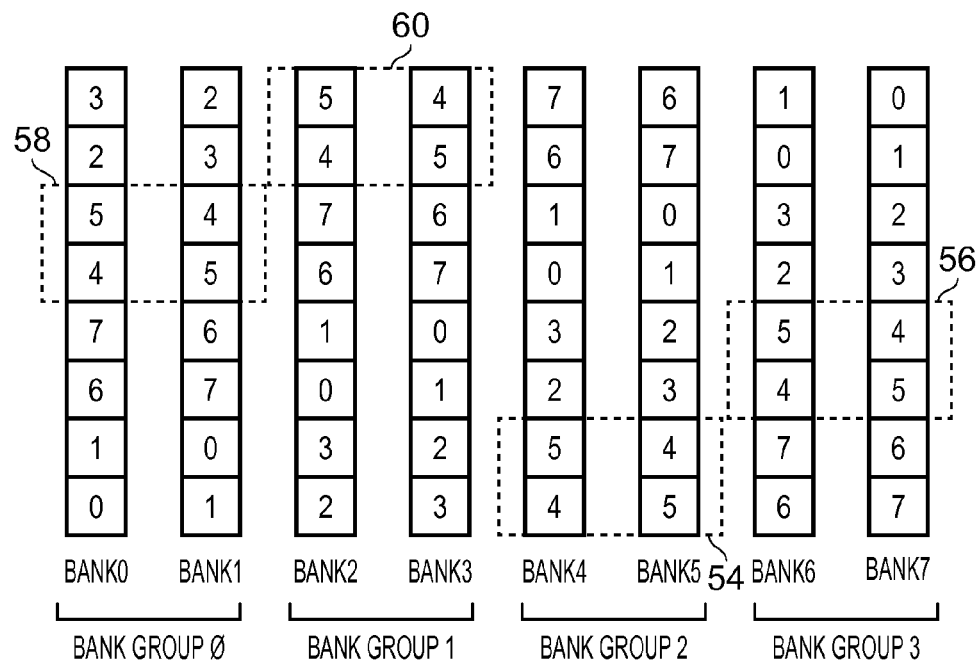
FIG. 5 schematically illustrates the physical arrangement of stored data items in a data storage apparatus in one embodiment.
Figure 6:
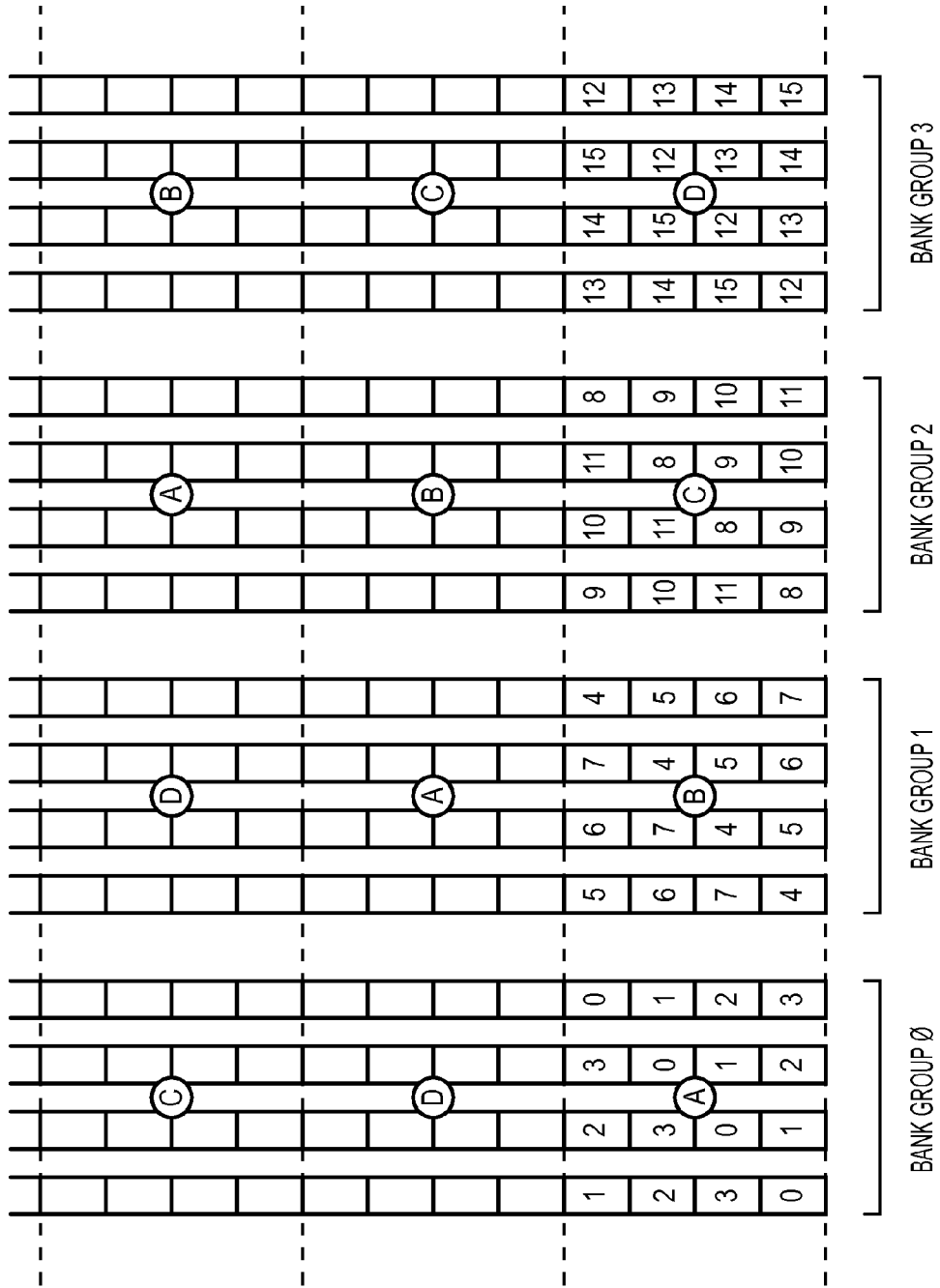
FIG. 6 schematically illustrates the physical arrangement of stored data items in a data storage apparatus in one embodiment.

The present techniques are not only applicable to the particular arrangement of banks and bank groups shown in FIG. 3 (i.e. four banks arranged in two bank groups) and FIGS. 4, 5, 6 and 7 show various different permutations of bank numbers and bank groups, with resulting example cache line storage patterns within the respective structures. FIG. 4 shows an example of 8 banks arranged into 2 bank groups, whilst FIG. 5 shows an example of 8 banks arranged into 4 bank groups. FIG. 6 shows an example of 16 banks arranged into 4 bank groups and FIG. 7 shows an example of 12 banks arranged into 4 bank groups. In FIG. 4, consider the sequence of storage locations used to store the data items (2.0-2.7), forming a cache line in way 2 of this example. Firstly, within dashed box 50, the wrap-around pattern of the first four data items (2.0-2.3) using all four banks within bank group 0 can be seen, before moving on to the next bank group (bank group 1) where dashed box 52 shows the second half of this cache line (data items 2.4-2.7) being stored in a similar pattern. A consideration of the dashed boxes 54, 56, 58 and 60 shown in FIG. 5 demonstrates the wrap-around usage of the bank groups at the coarser level of granularity of the hierarchical pattern, wherein the cache lines stored at these storage locations (for cache lines 4 and 5) each follow the same (crossed over) mini-pattern that is also used in the example of FIG. 3. The data items of each cache line are not individually labelled in FIG. 5.

FIG. 6 demonstrates the wrap-around usage of both the banks at the finer level of granularity of the hierarchical pattern and of the bank groups at the coarser level of granularity of the hierarchical pattern for the sequence of data items of sixteen cache lines stored in this example configuration. The wrap-around usage of the banks within each bank group is shown by the numerical patterns in each bank group in the lowest band of the figure labelled A-D. The second and third bands of the figure show how the patterns within these blocks A-D repeat when progressing upwards through the banks. The layout of the blocks A-D also show the wrap-around usage of the bank groups at the coarser level of granularity of the hierarchical pattern, wherein each block A-D can be seen to follow the wrap-around usage of the bank groups through the full bank structure. Finally, FIG. 7 shows an example of twelve banks arranged into four bank groups in which the wrap-around usage of the banks within each bank group and of the bank groups within the full structure can also be seen. The example of FIG. 7 highlights that the number of banks in each bank group need not be a multiple of two, and it should be appreciated that the number of bank groups into which the banks are grouped need also not be a multiple of two according to the present techniques.

Figure 8:
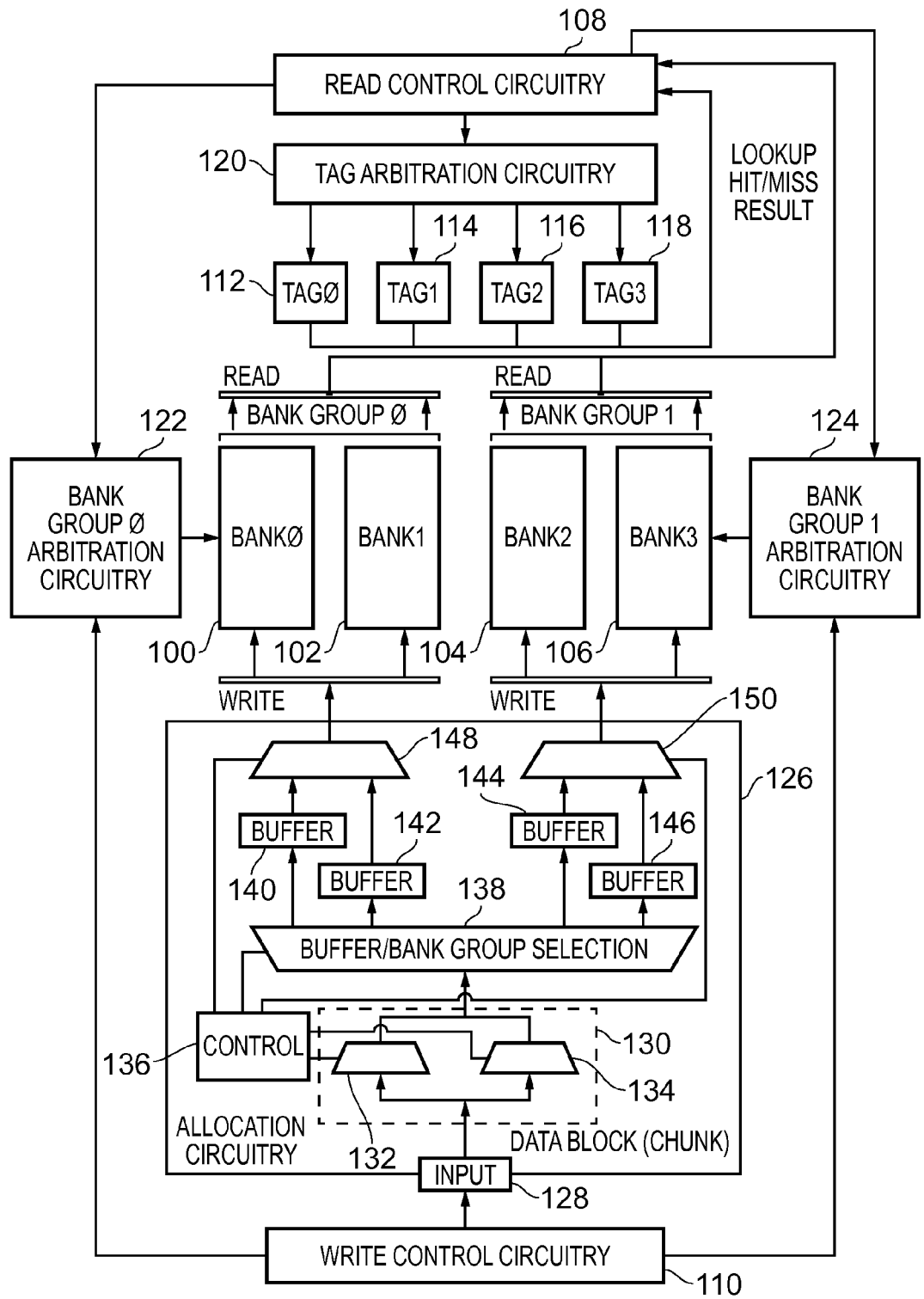
FIG. 8 schematically illustrates a set associative level one instruction cache in one embodiment.

FIG. 8 schematically illustrates some components of a set associative level one instruction cache, which may for example be provided as the level one instruction cache 20 shown in FIG. 1. The cache has four banks 100, 102, 104 and 106. Overall control of the usage of these banks is provided by the read control circuitry 108 and the write control circuitry 110. Associated with the data item storage provided by each of the banks 100-106 are respective tag portion storage 112, 114, 116 and 118. It should be appreciated that the representation shown in FIG. 8 is predominantly schematic, and in fact the storage provided by the tag and data item portions, for example, tag portion 112 and data item portion 100, may in fact form part of the same physical storage, with only a logical usage definition defining the two parts. The read control circuitry 108 interacts with the tag portions 112-118 via the tag arbitration circuitry 120 when access to the content therein should be made. For example, the read control circuitry 108 is configured to perform a look-up procedure in the tag portions when it should be determined if the content of a particular memory address is currently stored in the cache. The result of this lookup procedure (a hit or a miss) enables the read control circuitry 108 either to return the corresponding data items retrieved from the data banks 100-106 as the required output, or to signal that the content of this memory address is not currently stored in the cache and must be retrieved from further in the memory hierarchy.

The four banks 100-106 shown in FIG. 8 are grouped into a first bank group 0 and a second bank group 1. Access to each of these bank groups is controlled by respective arbitration circuitry 122 and 124, which are described in more detail below with reference to FIG. 9. The arbitration circuitry 122, 124 for each bank group provides arbitration between the various sources which seek access to the content of the banks. In this example embodiment, under the control of the read control circuitry 108 and the write control circuitry 110, the bank group arbitration circuitry 122 and 124 are configured to arbitrate between cache access requests from three different sources, namely a first source represented by the processor 12 itself with which this cache is closely associated, another processor (not illustrated) which is able to view the content of the cache although not modify its content) and the allocation circuitry 126 (shown in FIG. 8) by means of which the allocation of new (i.e. not currently stored) cache lines to the banks is made. Note that the control exercised by the arbitration circuitry 122, 124 over the banks 100, 102, 104 and 106 is only schematically shown in this figure by an arrow pointing to those banks, but the function of the arbitration circuitry 122, 124, and indeed of the tag arbitration circuitry 120, is to provide a single bank (or tag respectively) address and enable signal to each bank group (or tag portions respectively) determining which data items (and tag portions) will be accessed at any given cycle. More detail of this is shown in FIG. 9 and discussed below.

The allocation circuitry 126 comprises an input 128 at which a data block (chunk) is received from the write control circuitry 110 for allocation into the cache storage provided by the banks 100-106. The received data block is then passed to data reordering circuitry 130, which comprises two multiplexers 132, 134 which each receive the full data block, and in dependence on a selection signal received from the control unit 136 of the allocation circuitry 126, output either the first half chunk of the data block or the second half chunk of the data block. The control unit 136 provides the selection signals such that the data block received is either passed unamended beyond the data reordering circuitry 130, or the first and second halves of the data block are switched. The provision of the data reordering circuitry 130 close to the input enables the switching of the two halves of the received data block to be carried out, regardless of which bank group this data chunk is stored into, and avoids the need for such switching to be performed at a later stage in the allocation circuitry, where otherwise in this example two parallel sets of reordering circuitry would be needed, one for bank group 0 and one for bank group 1. Next, the (possibly reordered) data block is passed to the buffer/bank group selection demultiplexer 138 which also operates under the control of the control unit 136. Buffer/bank group selection demultiplexer 138 determines whether the data block should be stored in bank group 0 or bank group 1 (in accordance with the sequence of banks/bank groups defined by the hierarchical pattern of the present techniques) and into which of the four buffers 140, 142, 144, 146 this data block should be temporarily stored. Further multiplexers 148 and 150 select (also under control of the control unit 136) which of their respective input buffers should be connected to the write port of each bank at each cycle. Accordingly, the buffers 140, 142 and the multiplexer 148 form an allocation queue for bank group 0, whilst the buffers 144, 146 and the multiplexer 150 form an allocation queue for bank group 1. These allocation queues, as can be seen in FIG. 8, are independent of one another.

Figure 9:
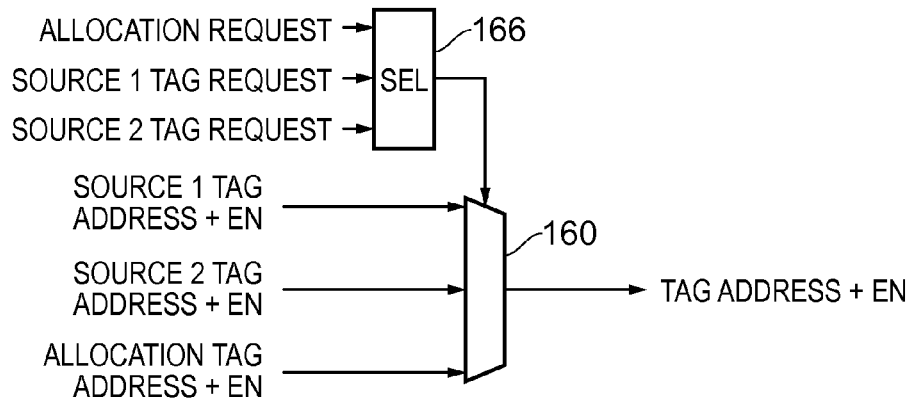
FIG. 9 schematically illustrates in more detail the tag and bank group arbitration circuitry of FIG. 8.
Figure 9:
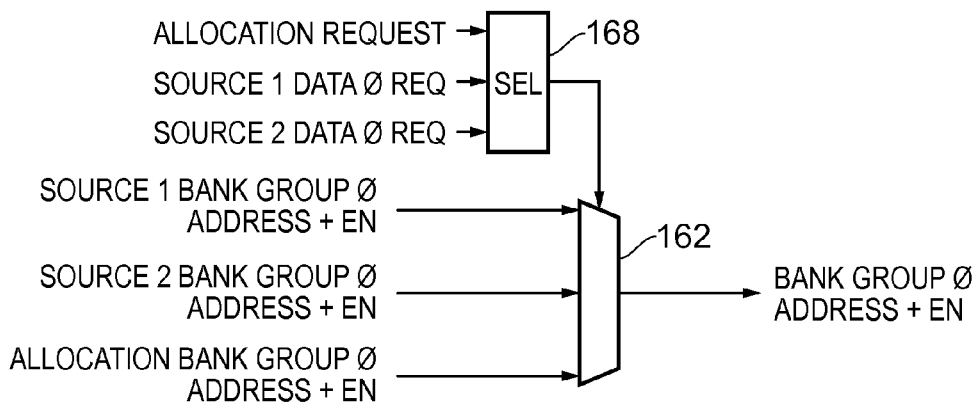
Figure 9:
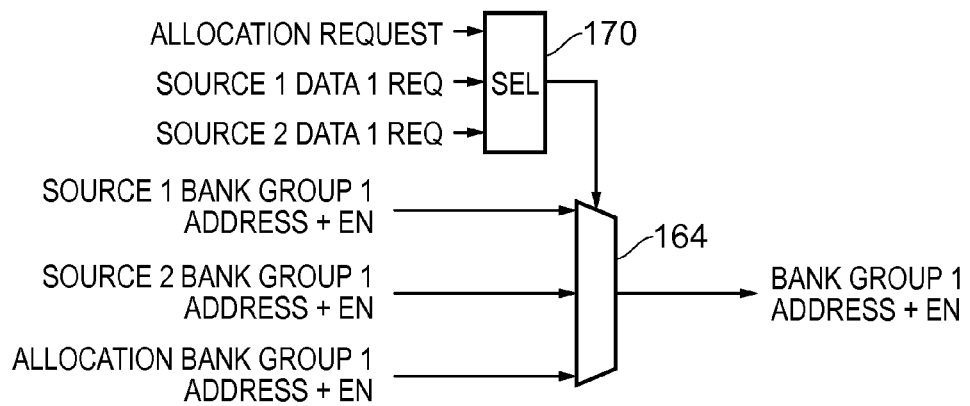

FIG. 9 schematically illustrates more detail of the tag and bank group arbitration circuitry of FIG. 8. The uppermost portion of FIG. 9 corresponds to components to be found in the tag arbitration circuitry 120, whilst the middle portion of FIG. 9 corresponds to components to be found in the bank group 0 arbitration circuitry 122, and the lowermost portion of FIG. 9 corresponds to components to be found in the bank group 1 arbitration circuitry 124. As can be seen in FIG. 9, each set of arbitration circuitry comprises a multiplexer 160, 162, 164 respectively which receives inputs from a first source, a second source and from an allocation source (i.e. the write control circuitry 110 as shown in FIG. 8). Each multiplexer 160, 162, 164 is configured to select between these inputs and provide one of them at its output. In the example shown in FIG. 9, the selection between these inputs is controlled by a selection unit 166, 168, 170 respectively, which itself receives an indication of whether there is currently an allocation request and/or a request from source one and/or a request from source two, and has a prioritisation between these sources which in this example is that a source one request (i.e. from the local processor 12) takes priority over a request from source two (the remote processor seeking to observe the content of the cache) and the allocation request. Moreover, the selection unit is further configured that only when neither source one or source two has a current request is the multiplexer 160, 162, 164 configured to provide the allocation input received as its output. Thus in summary, source one requests take priority over source two requests, and both of these take priority over an allocation request.

Figure 10B:
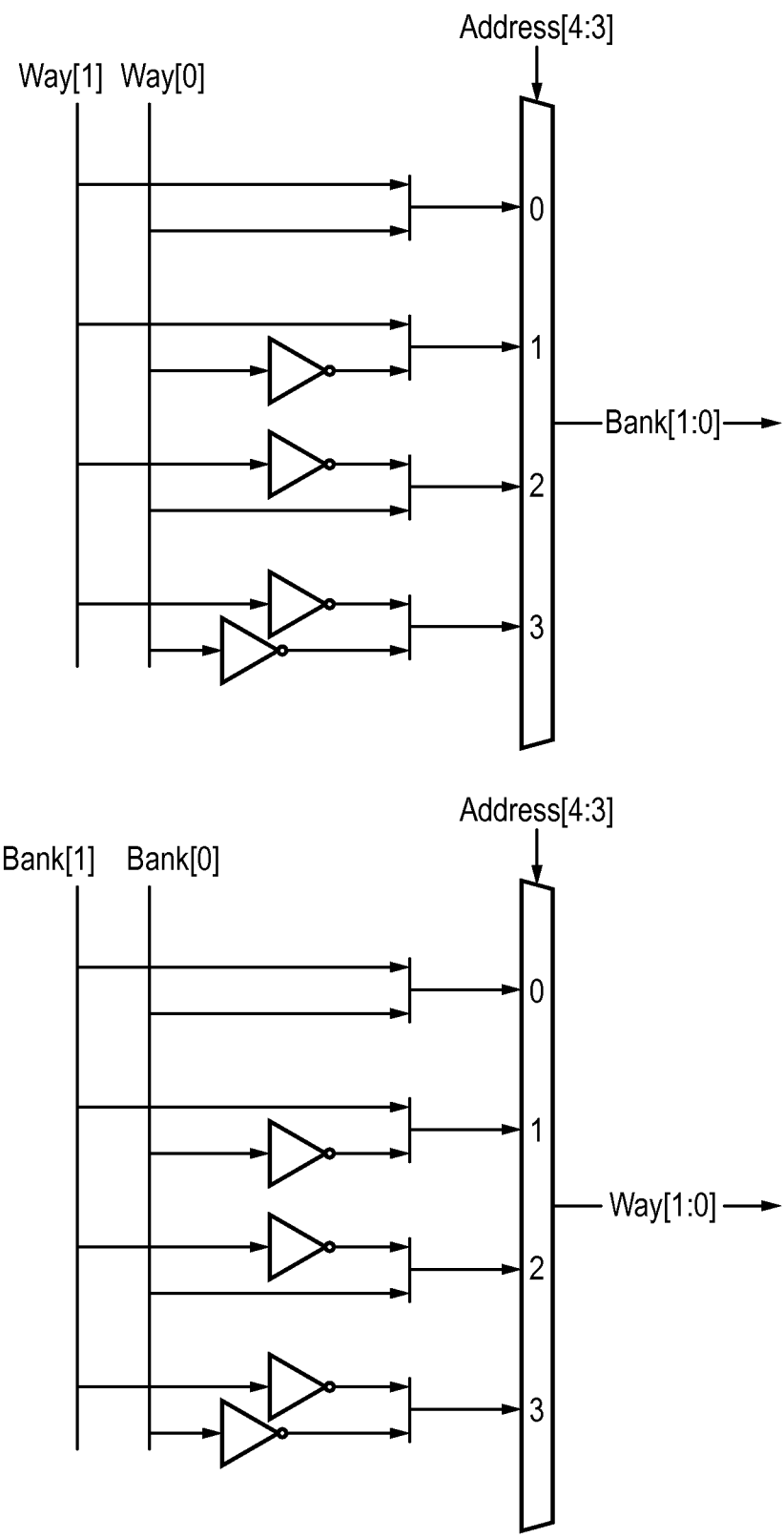
FIG. 10B shows example circuitry for implementing the way-to-bank translation and bank-to-way translation of FIG. 10A in one embodiment.

The above described organisation of the storage of data items into the data banks uses a mapping from each memory address and each data bank entry to its corresponding way number, and an example set of mapping logic (shown using Verilog syntax) used for the cache of FIG. 3 to translate the bank number to the way number is shown in FIG. 10A. As can be seen, in this four bank example the bank number is given by a 2-bit signal. The logic shown in FIG. 10A of course also provides a mapping (logically inverted) from way numbers to bank numbers. Indeed it is worthwhile noting that the logical function illustrated in FIG. 10A is in fact involutory (i.e. the inverse of the function is identical to the function), although this is generally not the case for all possible address/bank to way mappings. FIG. 10B shows example circuitry which may be used to implement the logical translations represented in FIG. 10A. The upper circuitry in FIG. 10B is configured to translate from way number to bank number (in dependence on the memory address), whilst the lower circuitry in FIG. 10B is configured to translate from bank number to way number (in dependence on the memory address).

Figure 11:
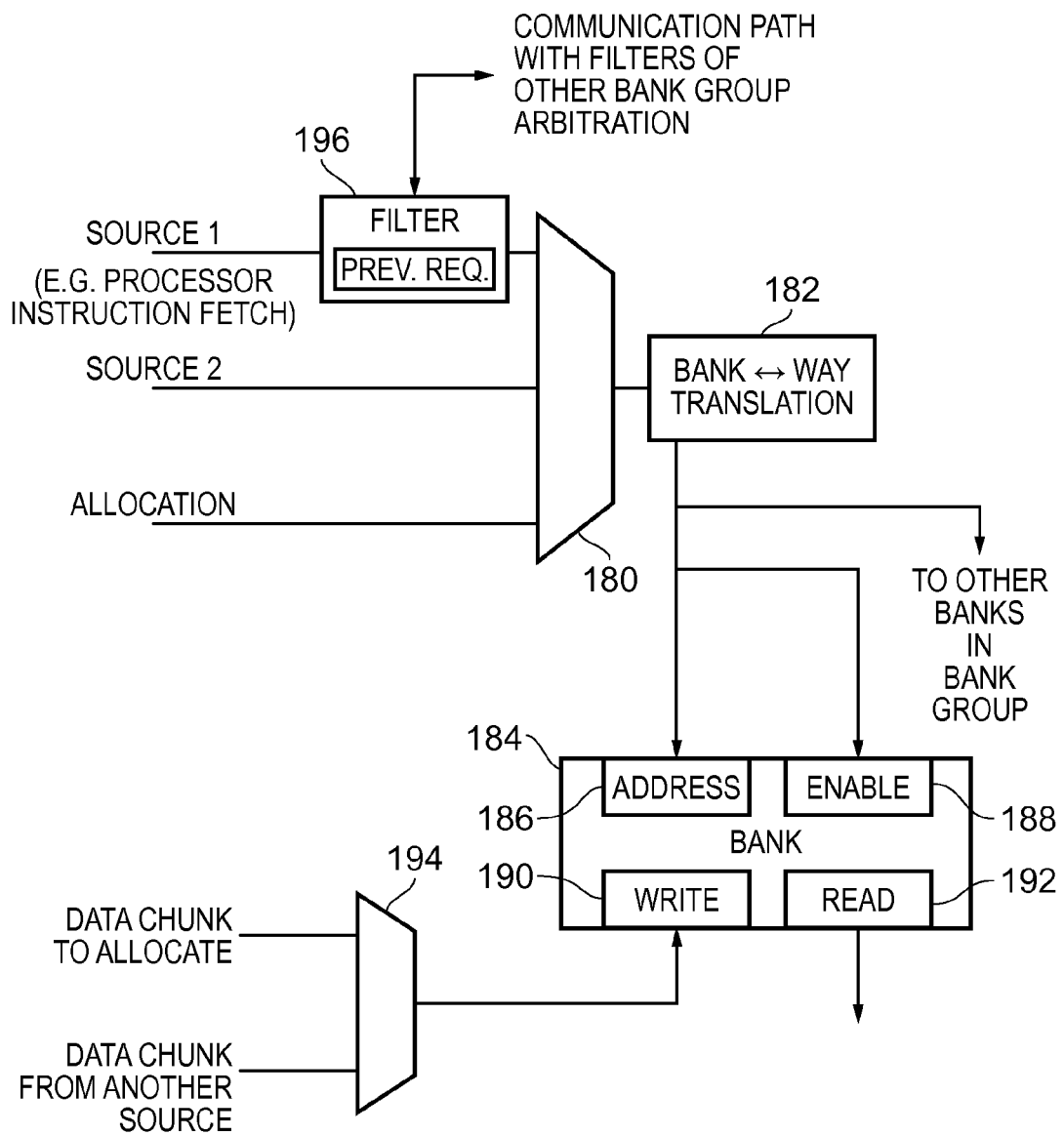
FIG. 11 schematically illustrates arbitration and allocation circuitry connected to a bank of a data storage apparatus in one embodiment.

FIG. 11 schematically illustrates both the arbitration and allocation circuitry for a given bank. The allocation circuitry in this schematic illustration corresponds to the multiplexer 180, the bank-way translation circuitry 182 and the filter circuitry 196. The allocation circuitry is represented here by the multiplexer 194, which selects between a data chunk to allocate and a data chunk from another source (which in this example is source one, namely the local processor which has the ability to write to this cache. The output of multiplexer 194 is provided to the write port 190 of the bank 184. The bank 184 is further shown in FIG. 11 to have a read port 192, and an address input 186 and an enable input 188. The selector 180 of the arbitration circuitry (described in more detail above with respect to FIG. 9) selects between the requests from source 1, source 2 and allocation. The output of this selection is passed via the bank-way translation circuitry 182 which implements the logical translation discussed above with a respect to FIG. 10. In dependence on the bank required for the request selected by the multiplexer 180, this address is either passed to the address input 186 of the bank 184 shown, or to another bank in the same bank group. The filter 196 shown in FIG. 11 is provided to improve the response of the cache to a sequence of read access requests, where some of those read access requests are repeated. For example, where the processor requests a particular cache line from the cache at a first cycle, where it is not yet know which way of the cache this cache line is stored in, it is necessary for the request to be passed to all banks of the cache for retrieval. However, when the same cache line is requested at the next cycle, the filter 196 can recognise this (with reference to an indication of the address requested at the previous cycle which it stores) and only forward this request to the multiplexer 180 if it was found at the previous cycle that the requested cache line was stored in this bank group. For this purpose the filter 196 is communicatively coupled via a communication path with the filters of other bank group arbitration circuitry, to ensure that only one filter allows the request to be passed to its multiplexer, whilst all others suppress that read access, thus allowing the arbitration circuitry of those other banks to simultaneously allow a different request (e.g. from source two or for allocation) at the same cycle.

Figure 12:
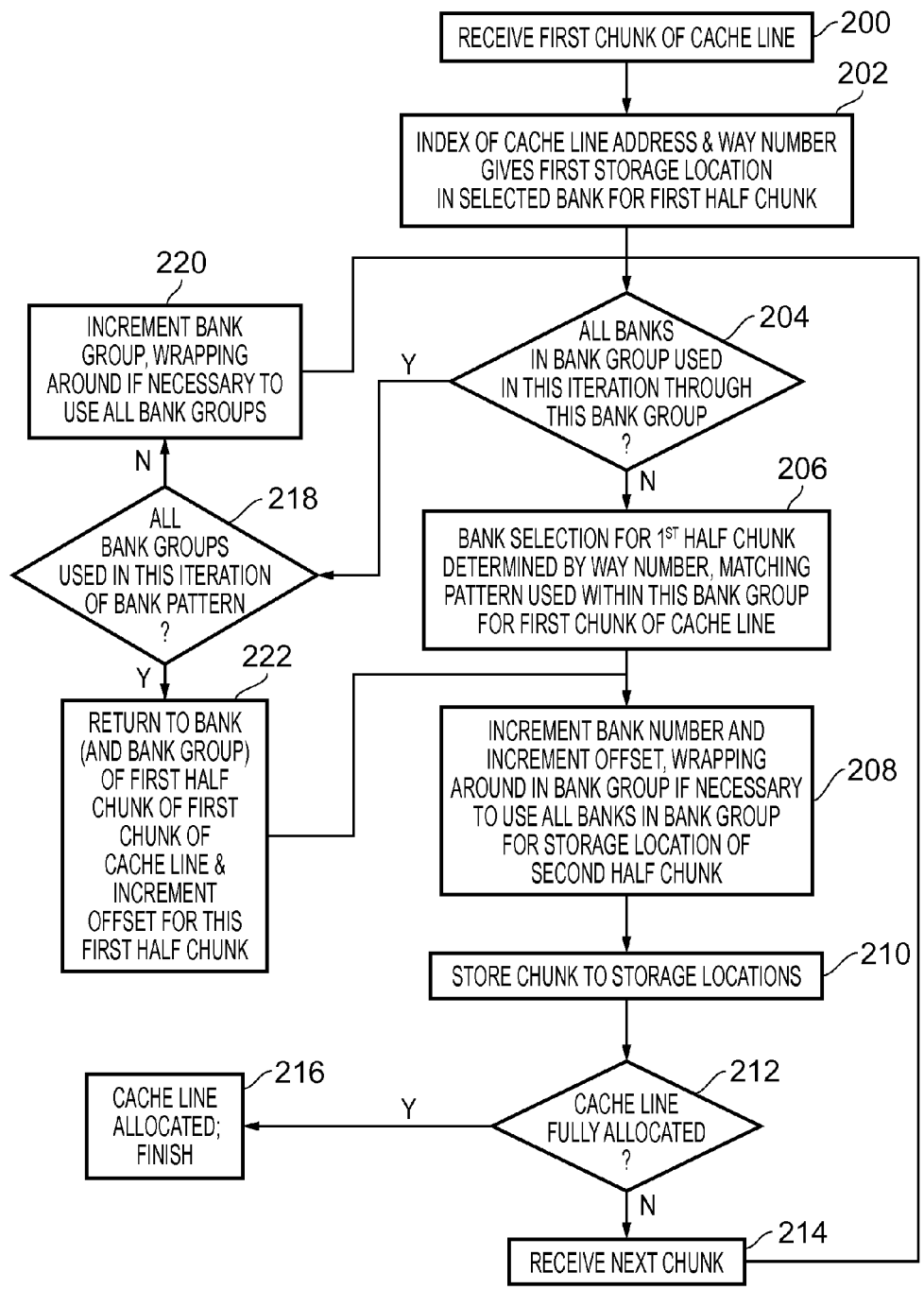
FIG. 12 shows a sequence of steps which are taken when allocating a cache line within a cache data storage apparatus in one embodiment.

FIG. 12 schematically illustrates a sequence of steps which are taken when allocating a cache line. This process implements the above discussed usage of the hierarchical pattern for the sequence of banks. The flow begins at step 200 where the cache receives the cache line to allocated and in particular the first data block (chunk) thereof. At step 202 the index and way number are determined, the index being derived from the cache line address and the way number being selected according to the replacement policy which is in use for the cache (least recently used, round robin etc.) to give the first storage location in the selected bank for the first data item (half chunk) of the first data block (chunk) received. Then at step 204 it is determined if all banks in the current bank group have been used in this iteration through this bank group. If they have not, which indeed will always be the case for the first data block (chunk) of the cache line, then the flow proceeds to step 206 where the bank selection for the first data item (half chunk) to be stored is determined by the way number, matching the pattern used within this bank group for the first data block (chunk) of the cache line. Then, at step 208 the storage location for the second data item of this data block (the second half of this chunk) is determined by incrementing the bank number and the offset, wrapping around in bank group if necessary to use all banks in the bank group for the storage of this second data item (second half chunk). Thus, at the conclusion of step 208 the storage locations for both halves of the data block (chunk) are known and at step 210 the data block (chunk) can be stored to the respective storage locations. Then at step 212 it is determined if this cache line has now been fully allocated. If it has not then the flow proceeds via step 214, where the next data block (chunk) of the cache line is received and the flow returns to step 204. If, however, at step 212 it is determined that the cache line has been fully allocated then the flow concludes at step 216 with the cache line having been fully allocated. Returning to a consideration of step 204, if it is determined that all banks in the bank group have been used in this iteration through the bank group then the flow proceeds to step 218 where it is determined if all bank groups have been used in this iteration of the bank pattern. If they have not, then the flow proceeds via step 220 where the bank group number is incremented, wrapping round if necessary to use all bank groups. The flow then continues via step 204 again. If, however, at step 218 it is determined that all bank groups have now been used in this iteration of the bank pattern then the flow proceeds via step 222, where the bank and bank group used for the first data item (half chunk) of the cache line is returned to and the offset is incremented for the current first data item (half chunk). The flow then proceeds via step 208. Thus, according to the steps illustrated in FIG. 12, when a cache line is to be allocated into the cache, the above described hierarchical pattern (of which examples are given in FIGS. 3 to 7) can be implemented.

Thus in overall summary, a data storage apparatus and method of storing data in a data storage apparatus are provided, where the data storage apparatus comprises multiple banks for storing data. The multiple banks form multiple bank groups, wherein each bank group comprising more than one bank. A first data item of a received data block is stored at a selected storage location in a selected bank and a subsequent data item of the data block is stored to a further storage location in a different bank according to a sequence of banks. The sequence of banks firstly comprises the selected bank followed by all other banks in the bank group of the selected bank. Moreover the sequence of banks respects a hierarchical pattern, wherein a finer granularity of the hierarchical pattern comprises all banks in a given bank group, and a coarser granularity of the hierarchical pattern comprises the given bank group followed by a different bank group to the given bank group. Access to the data storage apparatus is thereby improved.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data storage apparatus comprising:
multiple banks for storing data, wherein each bank of the multiple banks comprises multiple storage locations, each storage location for storing a data item,
wherein the multiple banks form multiple bank groups, each bank group comprising more than one bank;
an input for receiving a data block for storage, wherein the data block comprises multiple data items;
storage circuitry for storing a first data item of the data block at a selected storage location in a selected bank and for storing a subsequent data item of the data block to a further storage location in a different bank according to a sequence of banks; and
arbitration circuitry for selecting between multiple accesses, wherein the arbitration circuitry comprises an arbitrator for each bank group and each arbitrator is capable of arbitration independently of the other arbitrators,
wherein the sequence of banks firstly comprises the selected bank followed by all other banks in the bank group of the selected bank, and wherein the sequence of banks respects a hierarchical pattern, wherein a finer granularity of the hierarchical pattern comprises all banks in a given bank group, and a coarser granularity of the hierarchical pattern comprises the given bank group followed by a different bank group to the given bank group; and
wherein each arbitrator comprises a bank group filter, each bank group filter to suppress a read access to that arbitrator's bank group for a memory address used in a previous read access.

2. The data storage apparatus as claimed in claim 1, wherein the coarser granularity of the hierarchical pattern comprises the given bank group followed by all other bank groups.

3. The data storage apparatus as claimed in claim 1, wherein each storage location in each bank is identified by an index and an offset from the index, and the storage circuitry is capable of incrementing an offset of the selected storage location to give an offset of the further storage location.

4. The data storage apparatus as claimed in claim 1, wherein the storage circuitry is capable of incrementing bank numbers, with wrap-around when required to cover all banks per bank group, at the finer granularity of the hierarchical pattern.

5. The data storage apparatus as claimed in claim 1, wherein the storage circuitry is capable of incrementing bank group numbers, with wrap-around when required to cover all bank groups, at the coarser granularity of the hierarchical pattern.

6. The data storage apparatus as claimed in claim 1, wherein a size of each storage location times a number of banks in each bank group equals a size of the data block.

7. The data storage apparatus as claimed in claim 1, wherein the storage circuitry further comprises allocation circuitry for allocating data items for storage, wherein the allocation circuitry comprises an independent allocation queue for each bank group.

8. The data storage apparatus as claimed in claim 7, wherein the allocation circuitry comprises more than one data buffer for each bank group, wherein each data buffer is capable of buffering the data block.

9. The data storage apparatus as claimed in claim 7, further comprising data reordering circuitry coupled to the input, the data reordering circuitry for reordering data items within the data block received to correspond to an order given by the sequence of banks.

10. The data storage apparatus as claimed in claim 9, wherein the data reordering circuitry is capable of switching a first half of the data block and a second half of the data block.

11. The data storage apparatus as claimed in claim 1, wherein each bank has a single read/write port.

12. The data storage apparatus as claimed in claim 1, wherein the bank group filters are coupled together communicatively such that only one bank group filter does not suppress the read access.

13. The data storage apparatus as claimed in claim 1, wherein the data storage apparatus is a set associative cache.

14. The data storage apparatus as claimed in claim 13, wherein a number of the multiple banks for storing data corresponds to a number of ways in the set associative cache.

15. The data storage apparatus as claimed in claim 14, wherein the multiple banks for storing data are capable of storing tag data of the set associative cache, wherein storage of the tag data in storage locations of the multiple banks is not subject to the sequence of banks.

16. A method of storing data in a data storage apparatus comprising multiple banks, wherein each bank of the multiple banks comprises multiple storage locations, each storage location for storing a data item, and wherein the multiple banks form multiple bank groups, each bank group comprising more than one bank, the method comprising the steps of:

receiving a data block for storage, wherein the data block comprises multiple data items;

storing a first data item of the data block at a selected storage location in a selected bank and for storing a subsequent data item of the data block to a further storage location in a different bank according to a sequence of banks; and selecting between multiple accesses, wherein an arbitrator is provided for each bank group and each arbitrator is capable of arbitration independently of the other arbitrators, wherein the sequence of banks firstly comprises the selected bank followed by all other banks in the bank group of the selected bank, and wherein the sequence of banks respects a hierarchical pattern, wherein a finer granularity of the hierarchical pattern comprises all banks in a given bank group, and a coarser granularity of the hierarchical pattern comprises the given bank group followed by a different bank group to the given bank group, wherein each arbitrator suppresses a read access to that arbitrator's bank group for a memory address used in a previous read access.

17. A data storage apparatus comprising:

means for storing data in multiple banks, wherein each bank of the multiple banks comprises multiple storage locations, each storage location for storing a data item, wherein the multiple banks form multiple bank groups, each bank group comprising more than one bank;

means for receiving a data block for storage, wherein the data block comprises multiple data items;

means for storing a first data item of the data block at a selected storage location in a selected bank and for storing a subsequent data item of the data block to a further storage location in a different bank according to a sequence of banks; and means for selecting between multiple accesses comprising means for arbitration associated with each bank group and each means for arbitration is capable of performing said arbitration independently of the other means for arbitration, wherein the sequence of banks firstly comprises the selected bank followed by all other banks in the bank group of the selected bank, and wherein the sequence of banks respects a hierarchical pattern, wherein a finer granularity of the hierarchical pattern comprises all banks in a given bank group, and a coarser granularity of the hierarchical pattern comprises the given bank group followed by a different bank group to the given bank group; and wherein each means for arbitration comprises a means for suppressing a read access to that means for arbitration's bank group for a memory address used in a previous read access.

* * * * *

UNITED STATES PATENT AND TRADEMARK OFFICE
CERTIFICATE OF CORRECTION

| | | |
|---|---|---|
| PATENT NO. | : 9,690,482 B2 | |
| APPLICATION NO. | : 14/531596 | |
| DATED | : June 27, 2017 | |
| INVENTOR(S) | : Riga et al. | |

It is certified that error appears in the above-identified patent and that said Letters Patent is hereby corrected as shown below:

On the Title Page

(72) Inventors, "Maz Zardini" should read --Max Zardini--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*